United States Patent [19]

Benjamin et al.

[11] Patent Number: 4,586,767
[45] Date of Patent: May 6, 1986

[54] INDUCTIVE COUPLER SYSTEMS

[75] Inventors: Roy J. Benjamin, Bristol; David W. Pearce, Avon; Anthony W. Powell, Bristol, all of England

[73] Assignee: Marconi Avionics Limited, England

[21] Appl. No.: 619,477

[22] Filed: Jun. 11, 1984

[30] Foreign Application Priority Data

Jun. 29, 1983 [GB] United Kingdom ................ 8317659

[51] Int. Cl.$^4$ ........................................... H01R 13/629
[52] U.S. Cl. .................... 339/45 R; 339/48; 339/75 R; 339/255 R
[58] Field of Search .................. 336/210, 216; 339/48, 339/49 B, 255 R, 75 R, 75 M, 75 MP, 94 R, 94 A, 94 M, 45 R, 45 M

[56] References Cited

U.S. PATENT DOCUMENTS

| | | | |
|---|---|---|---|
| 1,223,222 | 4/1917 | Tomlinson | 339/48 |
| 3,004,236 | 10/1961 | Dickenson et al. | 339/75 M |
| 3,534,320 | 10/1970 | Rushing | 339/75 M |

FOREIGN PATENT DOCUMENTS

| | | | |
|---|---|---|---|
| 1033752 | 7/1958 | Fed. Rep. of Germany | 339/48 |
| 2262393 | 6/1974 | Fed. Rep. of Germany | 339/255 R |

Primary Examiner—John McQuade
Attorney, Agent, or Firm—Kirschstein, Kirschstein, Ottinger & Israel

[57] ABSTRACT

An inductive coupler system suitable for subsea use. The coupler has two sub-assemblies (17, 65) each including a magnetic half-core (35a, b). A tubular guide arrangement (18) is provided into which the first sub-assembly (17) is able to slide. The guide arrangement (18) includes means (63a, 63b) capable of co-acting with means (25a, 25b) fixed to the first coupler sub-assembly (17) so as to constrain the first coupler sub-assembly to take up a position within the guide arrangement to receive the second coupler sub-assembly (65) via an aperture (59) in the wall of the guide arrangement.

6 Claims, 7 Drawing Figures

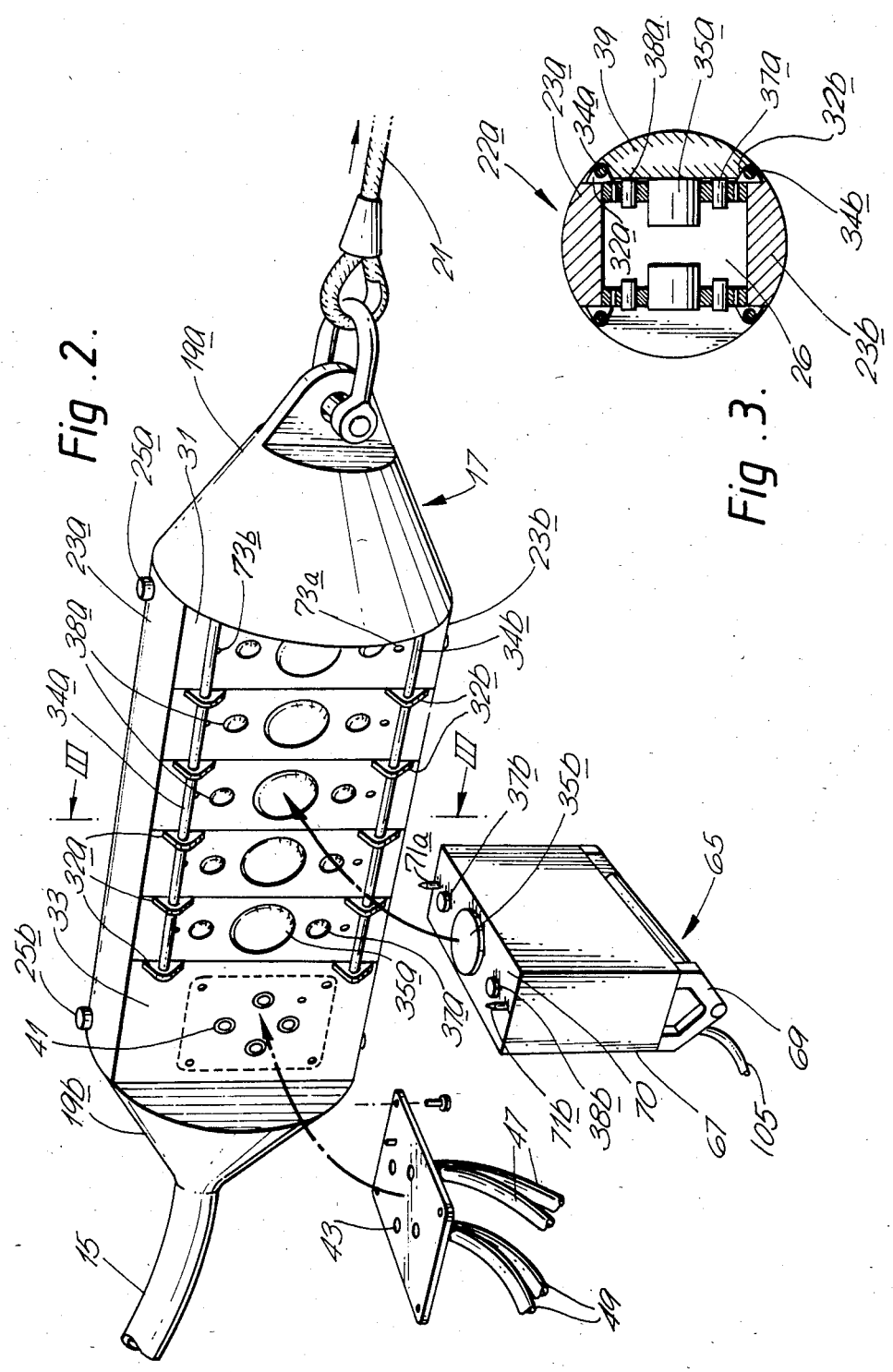

INDUCTIVE COUPLER SYSTEMS

This invention relates to inductive coupler systems, and has particular application to inductive coupler systems for use in undersea applications where the parts of the system are required to be assembled under water by a diver.

According to the invention an inductive coupler system comprises: a first coupler sub-assembly comprising a first frame member and, supported by said first frame member, a first magnetic half-core constituting one half of an inductive coupler; a second coupler sub-assembly comprising a second frame member and, supported by the second frame member, a second magnetic half-core constituting the other half of the inductive coupler; and a guide arrangement adapted to receive slidingly the first coupler sub-assembly, and including means capable of co-acting with means fixed to the first coupler sub-assembly so as to constrain the first coupler sub-assembly to take up a predetermined position with respect to the guide arrangement in which it is adapted to receive the second coupler sub-assembly via an aperture in the wall of said guide arrangement.

Preferably the system includes a carrier arrangement for holding the second coupler sub-assembly, the carrier arrangement comprising: support means for engaging complementary support means fixed to the first coupler sub-assembly so as to support the carrier arrangement with respect to the first coupler sub-assembly; and a lever which co-operates with the second coupler sub-assembly so as when operated in a first sense, to displace the second coupler sub-assembly with respect to the carrier arrangement along a direction towards a first coupler sub-assembly to a position where the second magnetic half-core contacts the first magnetic half-core, and when operated in a second sense to displace the second coupler sub-assembly with respect to the carrier arrangement along a direction away from the first coupler sub-assembly.

Preferably at least one of the half-cores is movable with respect to its associated frame member in said direction against the bias of a preloaded spring; and the travel of the second coupler sub-assembly with respect to the carrier arrangement during operation of the lever in said first sense, is such that said at least one of the half-cores is displaced against the spring bias.

Said one half-core is suitably disposed in a tubular member; and said spring comprises a series of disc springs which are under compression between abutments on the tubular member and the magnetic half-core, the disc springs having a substantially flat force/deflection characteristic over the range of movement of the half-core during operation of the lever.

In one particular embodiment of the invention a multiplicity of first magnetic half-cores are supported by a common frame member to constitute a multiplicity of first coupler sub-assemblies; and there are provided a corresponding multiplicity of second coupler sub-assemblies and a corresponding multiplicity of carrier arrangements for holding respective ones of the second coupler assemblies and each capable of engagement with respective ones of the first coupler sub-assemblies.

The first magnetic half-core of the or each first coupler sub-assembly is suitably supported by a mounting plate constituting part of the first frame member and provided with the complementary carrier support means.

One inductive coupler system in accordance with the invention is described hereafter, by way of example only, with reference to the accompanying drawings in which:

FIG. 2 is a view of part of the inductive coupler system showing an umbilical termination sub-assembly comprising a number of first coupler sub-assemblies on a common supporting frame member and showing one of a number of second coupler sub-assemblies of the system;

FIG. 3 is a cross section on the line III—III of FIG. 2;

Figure 1:
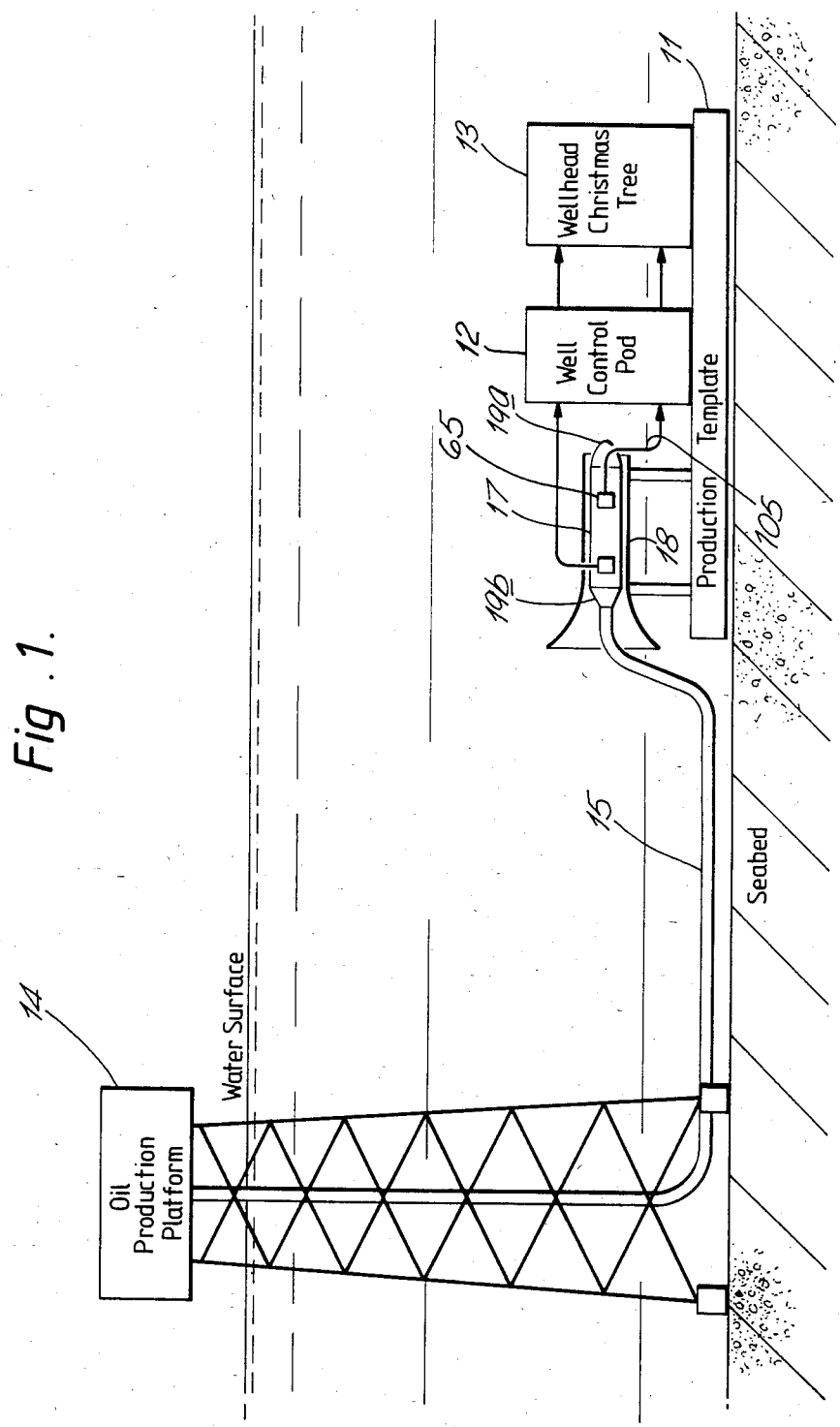
FIG. 1 is a block schematic diagram of a subsea wellhead control system incorporating the inductive coupler system.

Referring firstly to FIG. 1 the subsea oil production system includes production template 11 on which ten well-heads, indicated as 13, are grouped together. The well-heads 13 are controlled from a production platform 14 by means of an umbilical cable 15 including an electrical cable or cables via a well control pod 12. The umbilical cable 15 is laid independently of the template 11 and, at the end remote from the platform 14, is in connection with an umbilical termination sub-assembly 17 positioned in a guide chute 18 secured to the template 11.

Referring now also to FIG. 2, the umbilical termination sub-assembly 17 includes a torpedo shaped frame member having oppositely directed fairings, 19a, 19b. The forward fairing 19a i.e. the fairing to the right hand side of FIG. 2, has an attachment to which a winch (not shown) is attached by means of a pull-in cable 21. The rear fairing 19b, i.e. the fairing to the left hand side of FIG. 2, is connected to the forward fairing 19a by upper and lower elongate plates 23a, 23b each having a curved outer surface and a flat inner surface as best seen in FIG. 3. Each curved surface of the plates 23a, 23b has longitudinally aligned forward and rear location spigots 25a, 25b. Secured to the longitudinally extending edges of the plates 23a, 23b are ten mounting plates 31, one plate in respect of each well-head, a row of five plates being connected between each pair of opposed longitudinal edges of the plates 23a, 23b. In each plate 31 there are mounted three magnetic half-cores 35a, 37a, 38a of a first coupler sub-assembly, these cores being spring loaded for movement normal to the plate in a direction away from the frame, during coupling to a second coupler sub-assembly, as hereafter described. As will be further described hereafter, the magnetic half-core 35a constitutes half of a power inductive coupler, while the half-cores 37a, 38a each constitute a half of a signal coupler.

Referring now to FIG. 3, the rear surface of the fairing 19a, the inner surfaces of the plates 23a, 23b, the mounting plates 31 and a bulkhead (not shown) between the forward and rear sections of the first coupler sub-assembly define a chamber 26 of generally rectangular cross-section. The mounting plates 31 have seals (not shown) so that the chamber 26 is fluid tight, the chamber 26 being filled with a dielectric fluid pressurised at a pressure to balance the hydraulic pressure acting on the first coupler sub-assembly when submerged by a bellows unit (not shown) communicating with the surrounding water. Each plate 31 has two lugs 32a, 32b which support upper and lower mounting bars 34a, 34b respectively, the bars extending longitudinally along the first coupler sub-assembly. Each of the two rows of plates 31 is also provided with a transit cap 39, only one such cap being shown in FIG. 3.

A hydraulic chamber, separated from the forward section of the frame member by the bulk head is defined towards the rear of the umbilical termination assembly, the umbilical cable 15 passing through penetrators located in the bulk head into the more forward portion of the frame. A further plate 33 is connected between the longitudinally extending edges of the plates 23a, 23b to act as a cover plate to the hydraulic chamber. This plate 33 has four ports 41 which communicate with hydraulic pipes (not shown) within the chamber, and is designed for connection to a hydraulic connector plate 43 having passages connected to four hydraulic hoses, two 47 of which are for the conveyance of hydraulic fluid used in the operation of hydraulic actuators (not shown) in the well-head control system, and two 49 of which are for the conveyance of chemicals for injection into the well-head.

Figure 4:
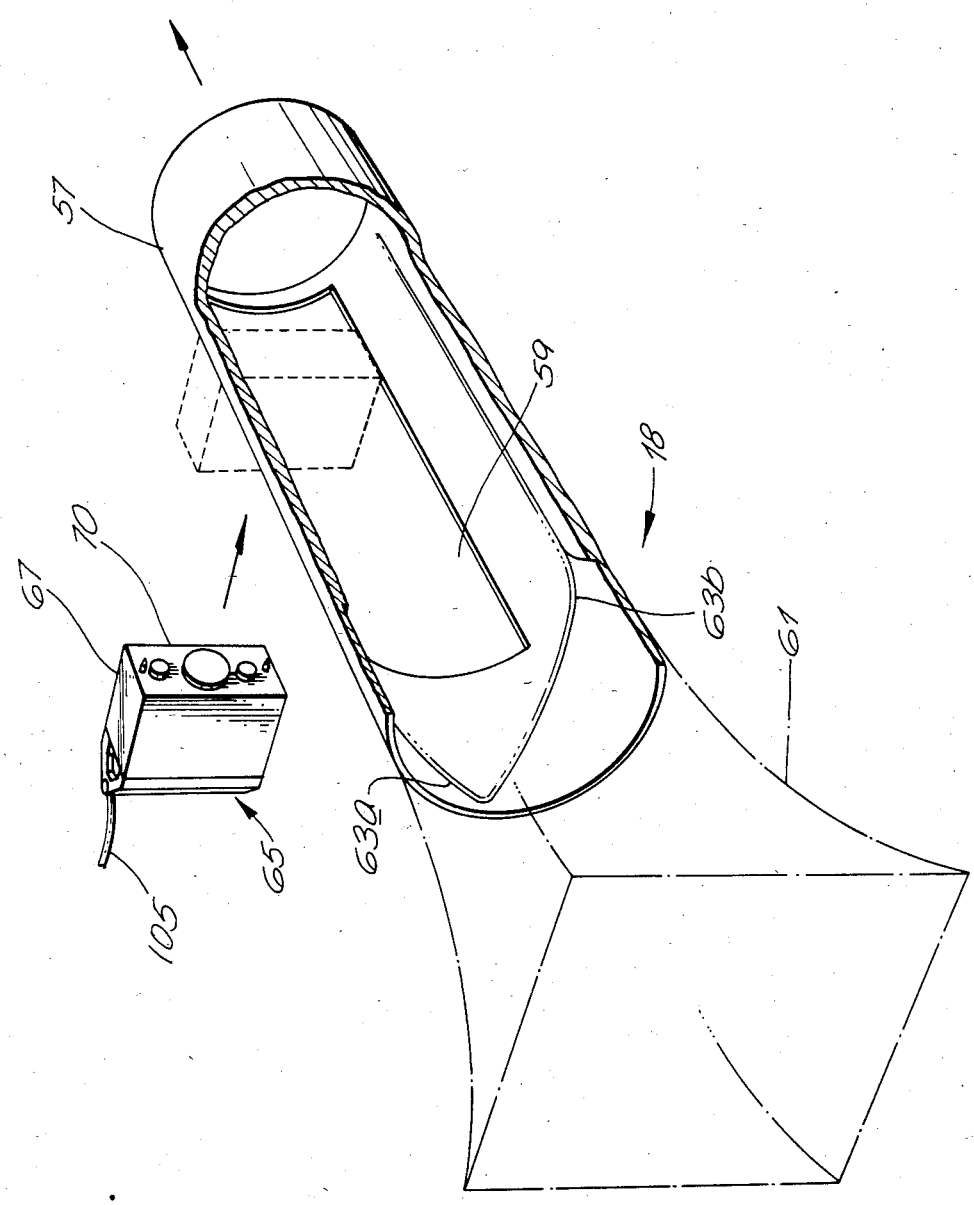
FIG. 4 is a partly cut away view of a guide chute for holding the umbilical termination sub-assembly.

Referring now also to FIG. 4 umbilical termination sub-assembly 17 is received within the pull-in guide chute 18. The chute 18 has an open-ended cylindrical stem portion 57 and a horn-shaped entrance portion 61. At either side of the stem portion is a cut out 59 whose purpose is to allow the first and second coupler sub-assemblies to be engaged as is described hereafter.

The cylindrical portion 57 of the chute 18 has an internal guide arrangement in the form of a groove having two symmetrical portions 63a, 63b.

The umbilical sub-assembly 17 is drawn into the chute 18 in the direction of the arrow by the action of a winch (not shown) on the cable 21. The sub-assembly, in the course of being so propelled, is brought to positive engagement with the chute by the capture first of the forward and then of the rear spigots 25a, 25b, respectively, by one or the other of the groove portions 63a, 63b, the particular groove portion engaged being dependent upon the initial orientation of the sub-assembly with respect to the chute. The interaction between the chute 18 and the sub-assembly 17 thus ensures that the sub-assembly is correctly positioned in the chute with respect to the template 11.

Returning now again to FIG. 2 in respect of each plate 31 there is provided a second coupler sub-assembly in the form of a pod coupler 65, only one such sub-assembly being shown in the drawings for the sake of clarity. Each pod coupler consists of a housing 67 provided with a carrying handle 69.

The face plate 70 of the housing 67 supports three magnetic half-cores 35b, 37b, and 38b constituting the second halves of the power inductive coupler, and signal couplers. Locating pins 71a, 71b project from the face 70, these being designed to mate with complementary dowel holes 73a, 73b in the plates 31. The rear of the housing 67 is formed with a flange 64. The housing 67 contains a dielectric fluid at a pressure to balance the subsea pressure to which the system is, in use, subject. As in the cavity 26 in the umbilical sub-assembly this pressure is provided by a bellows unit (not shown) communicating with the surrounding water. A lead 105 connected to the well control pod 12 is provided to the pod coupler sub-assembly 65.

Figure 5:
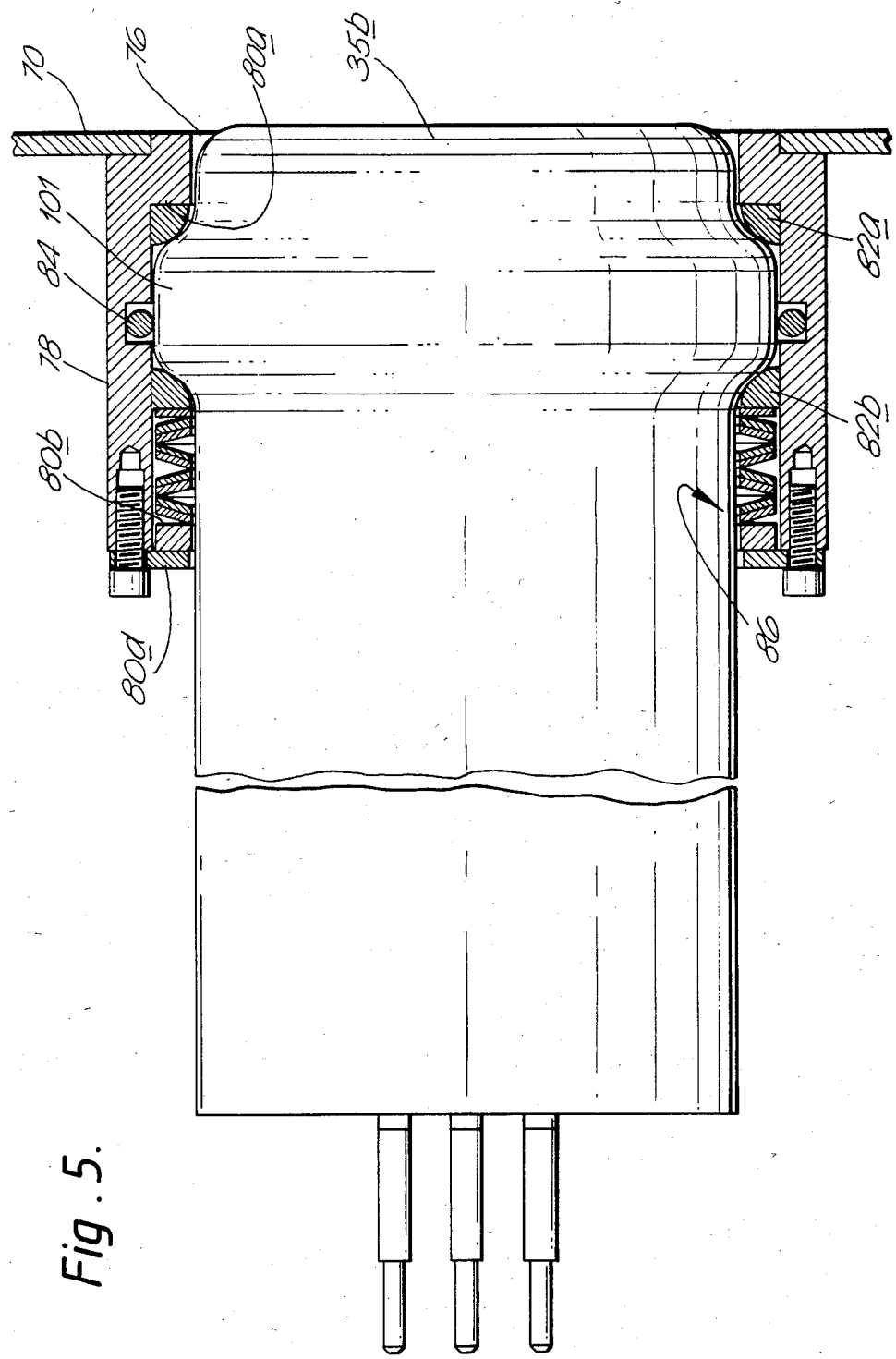
FIG. 5 is an enlarged sectional view of a second coupler sub-assembly.

Referring now to FIG. 5, similarly to the half-cores 35a, 37a, 38a supported in the plates 31, the half-cores 35b, 37b, 38b are spring loaded for movement in a direction normal to the face plate 70, the mechanism being as follows:

The face plate 70 of the housing 67 has a circular aperture 76. A tube 78 which is welded to the face plate 70 receives the forward portion of a power coupler half-core 35b. There is an annular internal abutment 80a, on the tube 78 and a retaining plate 80d. Between the abutment 80a and the plate 80d the half-core 35b has a portion 101 of increased diameter. At either end of the portion 101 there is a shoulder ring 82a, 82b, an O-ring 84 in contact with the portion 101 of the half-core 35b excluding water from the housing 67.

A series of disc springs, Belleville washers, 86 are held under compression between the rear shoulder ring 82b and the compression ring 80b which is itself supported by retaining plate 80d. The disc springs have the property that their force/deflection characteristic is nominally flat over part of their range of movement. Advantage is taken of this by arranging the initial compression of the springs so that the movement of the half-core falls within this range.

Similar mechanisms (not shown) are provided in respect of each of the signal coupler half-cores 37b, 38b, and also the half-cores 35a, 37a, 38a of the umbilical termination 17 for their movement with respect to the plates 31, as mentioned above.

Figure 6:
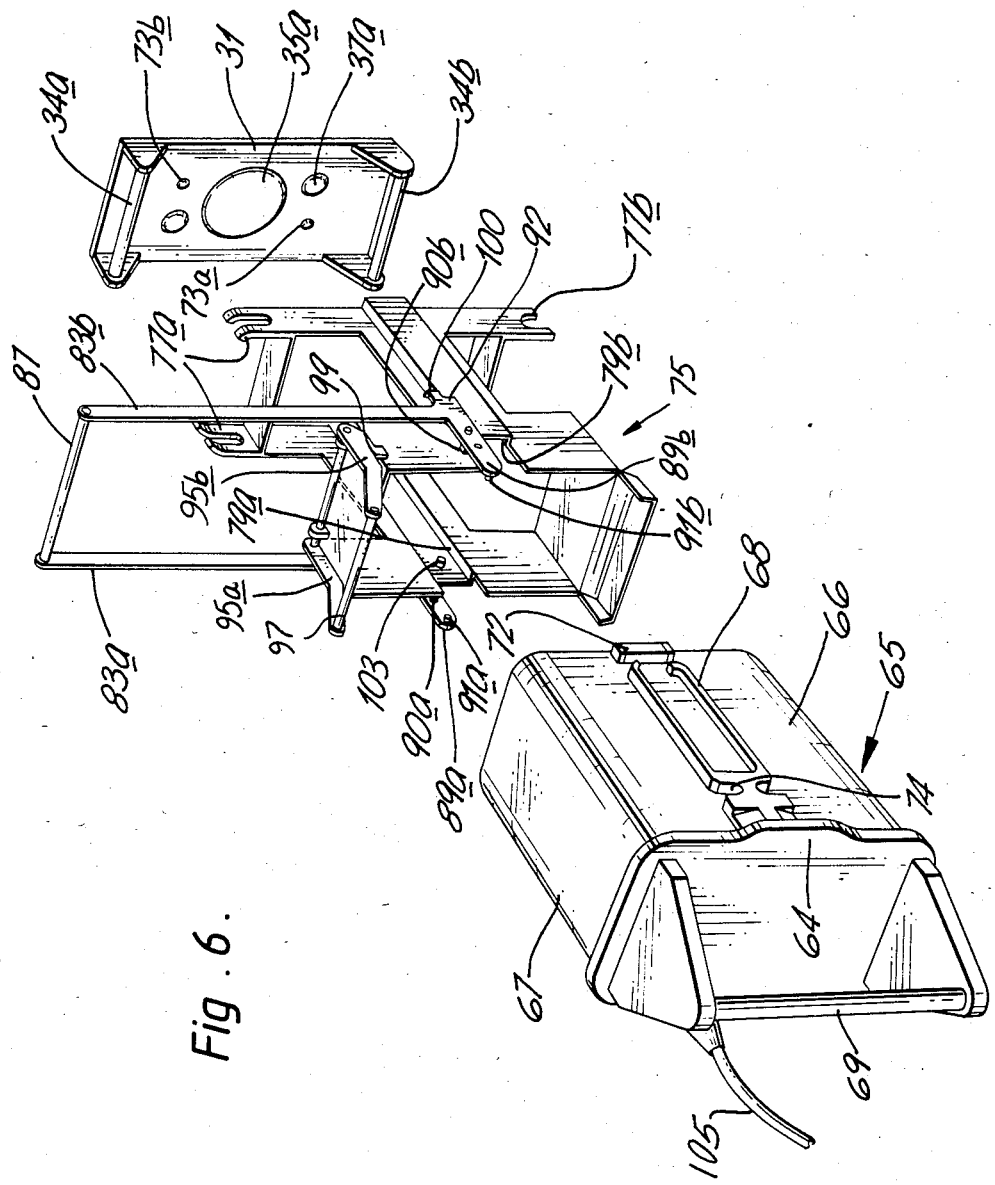
FIG. 6 is a perspective view of a second coupler sub-assembly and a carrier arrangement for the second coupler sub-assembly, and part of the frame member of FIG. 2.

As best shown in FIG. 6 each of the side walls 66 of the pod coupler sub-assembly 65 carries an integral longitudinally extending runner arrangement 68. At the forward end of one of the runner arrangements there is a polarising element 72. Towards the rear end of each runner arrangement 68 there is a notch 74. A face plate cover (not shown) is fitted on to the face plate 70 to protect the half-cores 35b, 37b and 38b during handling and installation.

Figure 7:
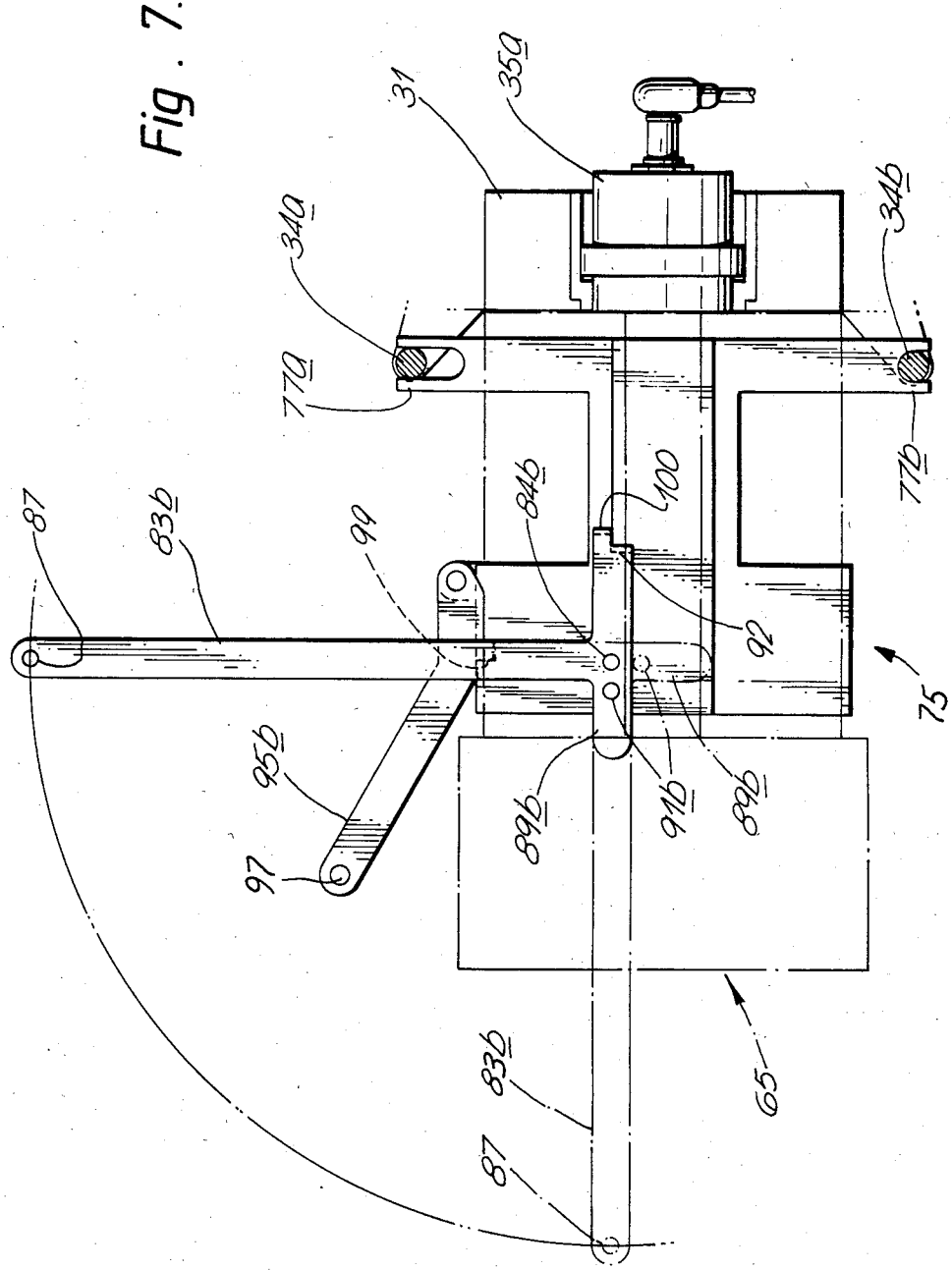
FIG. 7 is an enlarged side view of the carrier arrangement of FIG. 6 coupled to the frame member, showing the lever of the carrier arrangement in two alternative positions.

Referring now to FIG. 7 in respect of each pod sub-assembly 65 there is provided a carrier arrangement. The carrier arrangement 75 has upper and lower forked arms 77a, 77b which are adapted to engage the mounting bars 34a, 34b, respectively, so that the carrier arrangement may be supported by the umbilical termination sub-assembly 17.

The forked arms 77a, 77b are part of a frame structure which includes two channel shaped guide rails 79a, 79b.

Pivoted on the frame structure at laterally spaced positions 84b, towards the front ends of the guide rails 79a, 79b is a lever having two long arms 83a, 83b ganged together by an operating handle 87, and two short lever arms 89a, 89b each extending at right angles to a respective long arm. The short arms 89a, 89b each carry, part way long their length pod coupler sub-assembly engagement pins 90a, 90b, and at their extremities, ejector pins 91a, 91b. Each short arm 89a, 89b also carries a stop lug 92 and a latching lug 100.

A latching mechanism has as best seen in FIG. 7 two arm members 95a, 95b ganged together by a handle portion 97. The arm members 95a, 95b are pivoted on the frame structure of the carrier arrangement 75. Each of the arms 95a, 95b has an abutment 99.

In order to engage two halves of an inductive coupler a diver will perform the following operating sequence:

The transit caps 39 are removed to expose the coupler half-cores on the umbilical termination 17. There may be secondary covers (not shown) serving to protect the faces of the half-cores during installation. The upper forked arms 77a, of the carrier arrangement are then offered up to an upper mounting bar 34a of the mounting plate 31, this action also serving to dislodge the secondary protective covers (if present) over the half-core faces. The lower forked arms 77b are then swung to engage the corresponding lower mounting bar 34b, the carrier arrangement being then supported with respect to the umbilical termination sub-assembly. Any secondary protective covers may then be removed.

A pod sub-assembly 65 is offered into the carrier arrangement such that the runner arrangements 68 engage the guide rails 79a, 79b. If the pod sub-assembly is inverted the polarising lug 72, at the front end of the rail 68, engages a stop element 103 on the carrier arrangement, so preventing further entry of the pod sub-assembly.

With the pod sub-assembly 65 received within the carrier arrangement, with the runners 68 in engagement with the channel shaped guide rails 79a, 79b, the upper leading edges of the runners 68 strike the stop lugs 92 which extend into the guide rails 79a, 79b, thus preventing further entry of the pod sub-assembly at this stage. The position of the pod sub-assembly is now such that the diver can easily remove a face plate cover (not shown) protecting the half-cores.

The diver then reaches into the carrier arrangement and removes the face plate cover from the front face 70 of the pod sub-assembly 65.

By pulling the handle 87 anticlockwise as viewed in FIG. 7 the stop lugs 92 are disengaged thus allowing the pod sub-assembly 65 to be slid further into the carrier until the flange 64 on the housing 67 strikes the ejector pins 91a, 91b. The pod sub-assembly is now in a position such that the engagement pins 90a, 90b on the short lever arms 89a, 89b can enter the notches 74 in the side runners 68a, 68b when handle 87 is moved further anticlockwise.

The handle 87 is next pulled down so that the long lever arms 85a, 85b approach the horizontal. In the course of this movement the pod sub-assembly is driven forward by contact between the pins 90a, 90b and the forward surfaces of the notches 74 until the faces of the half-cores contact one another. If the diver then applies a force of about 100 newtons to the handle 87, the mechanical advantage in the levers is such that an axial force of about 2000 newtons is produced. The disc springs in the two complementary sub-assemblies deflect and polarising pins 71a, 71b in the pod sub-assembly and the complementary receptacles 73a, 73b in the termination sub-assembly ensure accurate alignment of the mating half-core faces and face-to-face intimate contact between the faces of the half-cores.

Finally the latching mechanism is operated. The handle 97 is moved downwards so that the abutments 99 may engage the latching lugs 100 on the short lever arms 89a, 89b thereby locking the pod sub-assembly in the mated position.

When it is required to disconnect the two halves of the inductive coupler, disconnection is essentially a reversal of the above sequence. Initially, as handle 87 is lifted, engagement pins 90a, 90b contact the rear surfaces of the notches 74 and commence the backward movement of the pod sub-assembly. Thus positive extraction of the pod sub-assembly from the carrier arrangement is provided, to overcome any tendency for seizure to occur after prolonged exposure to the marine environment. After a short distance the engagement pins slip out of the notches, whereupon ejector pins 91a, 91b contact the flange 64 on the housing 67 to provide the remainder of the extraction movement.

We claim:

1. A manually-operable, under-water, inductive coupler system comprising:
(A) a first fluid-tight coupler sub-assembly including
  (i) a first frame member and,
  (ii) supported by said first frame member, a first magnetic half-core constituting one half of an inductive coupler;
(B) a second fluid-tight coupler sub-assembly including
  (i) a second frame member and,
  (ii) supported by the second frame member, a second magnetic half-core constituting the other half of the inductive coupler; and
(C) an open-ended tubular guide arrangement
  (i) in the wall of which means is provided defining an aperture,
  (ii) said guide arrangement including means for receiving slidingly the first coupler sub-assembly through one end of the tubular arrangement, and
  (iii) including means capable of co-acting with means fixed to the first coupler sub-assembly during the sliding reception movement of the first coupler sub-assembly in the guide arrangement so as to constrain the first coupler sub-assembly to take up a predetermined position with respect to the guide arrangement in which it is adapted to receive the second coupler sub-assembly via said aperture, regardless of the initial orientation of the first coupler sub-assembly with respect to the guide arrangement.

2. An inductive coupler system according to claim 1 including a carrier arrangement for holding the second coupler sub-assembly, the carrier arrangement comprising: support means for engaging complementary support means fixed to the first coupler sub-assembly so as to support the carrier arrangement with respect to the first coupler sub-assembly; and a lever which co-operates with the second coupler sub-assembly so as when operated in a first sense to displace the second coupler sub-assembly with respect to the carrier arrangement along a direction towards the first coupler sub-assembly contacts the first magnetic half-core and when operated in a second sense to displace the second coupler sub-assembly with respect to the carrier arrangement along a direction away from the first coupler sub-assembly.

3. An inductive coupler system according to claim 2 in which at least one of the half-cores is movable with respect to its associated frame member in said direction against the bias of a preloaded spring; and the travel of the second coupler sub-assembly with respect to the carrier arrangement during operation of the lever in said first sense is such that said at least one of the half-cores is displaced against the spring bias.

4. An inductive coupler system according to claim 3 in which said spring comprises a series of disc springs which are under compression between abutments on a tubular member and the magnetic half-core, the disc springs having a substantially flat force/deflection characteristic over the range of movement of the half-core during operation of the lever.

5. An inductive coupler system according to claim 2 in which a multiplicity of first magnetic half-cores are supported by a common frame member to constitute a multiplicity of first coupler sub-assemblies; and there are provided a corresponding multiplicity of second coupler sub-assemblies; and a corresponding multiplicity of carrier arrangements for holding respective ones of the second coupler assemblies and each capable of engagement with respective ones of the first coupler sub-assemblies.

6. An inductive coupler system according to claim 2 in which the first magnetic half-core of the first coupler sub-assembly is supported by a mounting plate constituting part of the first frame member and provided with the complementary carrier support means.

* * * * *